B. F. CRANWELL, C. F. F. ALLAN & J. H. TRUDGEON.
BROADCAST ATTACHMENT FOR PLANTERS AND FERTILIZER DISTRIBUTERS.
APPLICATION FILED AUG. 8, 1906.

923,023.

Patented May 25, 1909.

INVENTORS
Benjamin Franklin Cranwell
Charles Frederick Fox Allan
Joseph Henry Trudgeon BY Munn & Co.

ATTORNEYS

WITNESSES

UNITED STATES PATENT OFFICE.

BENJAMIN FRANKLIN CRANWELL, OF HENDERSON, AND CHARLES FREDERICK FOX ALLAN AND JOSEPH HENRY TRUDGEON, OF AUCKLAND, NEW ZEALAND.

BROADCAST ATTACHMENT FOR PLANTERS AND FERTILIZER-DISTRIBUTERS.

No. 923,023.            Specification of Letters Patent.            Patented May 25, 1909.

Application filed August 8, 1906. Serial No. 329,681.

*To all whom it may concern:*

Be it known that we, BENJAMIN FRANKLIN CRANWELL, a resident of Henderson, Auckland, New Zealand, and CHARLES FREDERICK FOX ALLAN and JOSEPH HENRY TRUDGEON, residents of Auckland, New Zealand, all subjects of the King of Great Britain, have invented a new and Improved Broadcast Attachment for Planters and Fertilizer-Distributers, of which the following is a full, clear, and exact description.

The purpose of the invention is to provide a broadcast attachment to planters, seed drills, fertilizer distributers and like machines, which attachment will be simple, economic and durable and will act to automatically spread seed or fertilizing material as it passes through its tubular body from a source of supply, and which will further spread and scatter the material at its discharge end and distribute it in a broadcast manner and so that the discharged material will be largely protected from the action of the wind.

A further purpose of the invention is to provide a device of the character described that may be quickly and conveniently adapted to any seed or fertilizer chute and which will constitute practically a nozzle therefor.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
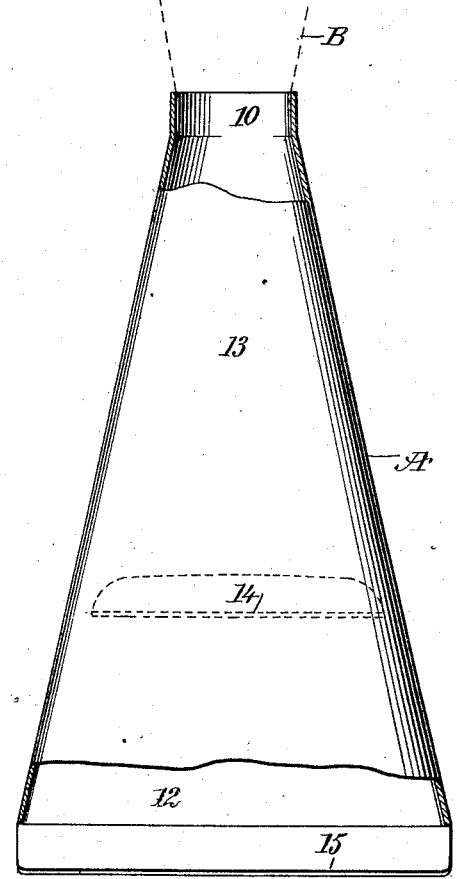
Figure 2:
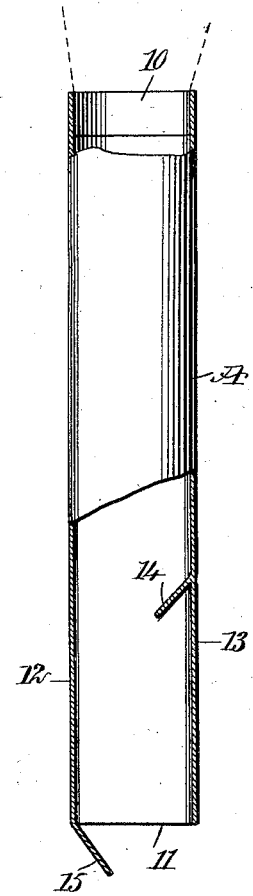
Figure 3:
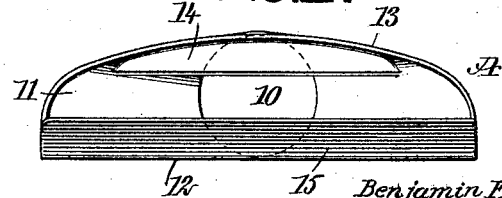

Figure 1 is a front elevation of the improved device, parts being broken away; Fig. 2 is an edge view of the device, parts being also broken away; and Fig. 3 is a bottom plan view of the device.

The distributer is preferably made of sheet metal, although it may be cast or wrought if so desired, and constitutes a body A which is of tapering form, being widest at its lower end. Its upper or contracted end 10 is usually circular and is open so that it may be readily slipped over the chute or distributing tube B connected with the seed box, or a receptacle containing fertilizing material, or other material to be distributed. The lower end 11 of the tubular body A is likewise open, and its back portion 12 is flat while its front 13 is outwardly convexed.

A spreading lip 14 is bolted, riveted or otherwise secured to the front curved portion 13 of the body at the interior thereof, and this spreading lip 14 is given a downward and rearward inclination, as is shown in Fig. 2, and said lip, if desired, may constitute an integral portion of the body. The spreading lip 14 terminates usually short of a central vertical line drawn through the said tubular body A as is shown in Figs. 2 and 3, and at the rear portion of the lower end 11 of the said body A a distributing or scattering lip 15 is attached to the body or made integral therewith. This scattering or distributing lip 15 extends from side to side of the body and is given a downward and forward inclination as is shown in both Figs. 2 and 3. The spreading lip 14, however, is of less length than the width of the body A where the said lip is applied, and we desire it to be understood that any number of spreading lips may be employed, and when more than one is used they are placed alternately at the front and at the back of the body A, or vice versa. When a single spreading lip 14 is used, as is shown in the drawings, it is placed between the center and the lower end of the body A at that side which is opposite the point of attachment of the distributing or scattering lip 15.

In operation, the material falling down through the body A from its source of supply, strikes the lip 14 and is spread out largely thereby and conducted therefrom downward to an engagement with the upper inner face of the distributing or scattering lip 15, and the material then slides off from said lip 15 and is sown or deposited on the ground in a broadcast manner.

Having thus described our invention, we claim as new and desire to secure by Letters Patent,—

1. A broadcast attachment for planters and like machines, consisting of a tubular tapering body open at both ends and having an interior spreading lip between its ends and an opposing distributing or scattering lip at its lower end, the said distributing lip projecting below the lower open end of said body.

2. A broadcast attachment for planters, fertilizer distributers and the like, consisting of a tubular tapering body open at both ends and provided with an interior spreading lip at its forward portion, having a downward inclination, and a wider distributing or scattering lip at its lower or discharge end, extending from the rear of the said body at an inclination in a forward direction, the said distributing lip projecting below the lower open end of the body.

3. As an improved article of manufacture, a broadcast attachment for planters, fertilizer distributers and the like, consisting of a tubular tapering body wider at its lower end and open at both ends, the upper or contracted end being circular in shape, the rear of the said body being flat and its forward portion outwardly convexed, a spreading lip located within the said body and secured to its forward curved portion and having a downward and rearward inclination, and a wider distributing or scattering lip located at the lower end of said body, extending from the back thereof downwardly and forwardly and projecting below the lower open end of said body, said distributing or scattering lip being of a length corresponding to the full width of the said body at its discharge end.

4. A broadcast attachment for planters and like machines, comprising a tubular body open at both ends, the rear of the said body being flat and its front portion outwardly curved, an interior spreading lip projecting from the front curved portion, and a distributing or scattering lip projecting from the lower end of the rear or flat portion of the body.

5. A broadcast attachment for planters and like machines, comprising a tubular tapering body, wider at its discharge than at its inlet end, and of greater diameter from side to side than from the front to the rear, the said body having an interior spreading lip between its ends and located nearer its discharge end than its inlet end, and a distributing or scattering lip projecting from its discharge end, the said lips being on opposing faces of said body and projecting downwardly in opposite directions.

In testimony whereof we have signed our names to this specification in the presence of two subscribing witnesses.

BENJAMIN FRANKLIN CRANWELL.
CHARLES FREDERICK FOX ALLAN.
JOSEPH HENRY TRUDGEON.

Witnesses:
  JOE SPENCE,
  ALFD. J. F. MORROW.